No. 844,999. PATENTED FEB. 19, 1907.
M. GOLD.
EYEGLASS SPRING.
APPLICATION FILED FEB. 27, 1906.

WITNESSES:

INVENTOR.
Myer Gold
BY
ATTORNEY.

THE NORRIS PETERS CO., WASHINGTON, D. C.

UNITED STATES PATENT OFFICE.

MYER GOLD, OF SAN FRANCISCO, CALIFORNIA, ASSIGNOR TO ALEXANDER R. McINTIRE, OF PHILADELPHIA, PENNSYLVANIA, GEO. W. MAGEE, OF OVERBROOK, PENNSYLVANIA, AND EDGAR A. BROWN, OF NEWBOLD, NEW JERSEY, TRADING AS McINTIRE, MAGEE & BROWN, OF PHILADELPHIA, PENNSYLVANIA, A FIRM.

EYEGLASS-SPRING.

No. 844,999.     Specification of Letters Patent.     Patented Feb. 19, 1907.

Application filed February 27, 1906. Serial No. 303,227.

*To all whom it may concern:*

Be it known that I, MYER GOLD, a citizen of the United States, residing at San Francisco, in the county of San Francisco and State of California, have invented certain new and useful Improvements in Eyeglass-Springs, of which the following is a specification.

This invention relates to improvements in eyeglass-springs, the object of the invention being to provide an improved spring which will prevent tilting of the lenses from a vertical position, which will permit of independent adjustment for the two lenses relatively to the bridge, and which enable the spring to be adjusted for differences in heights of the crest of the nose in different persons.

Figure 1:
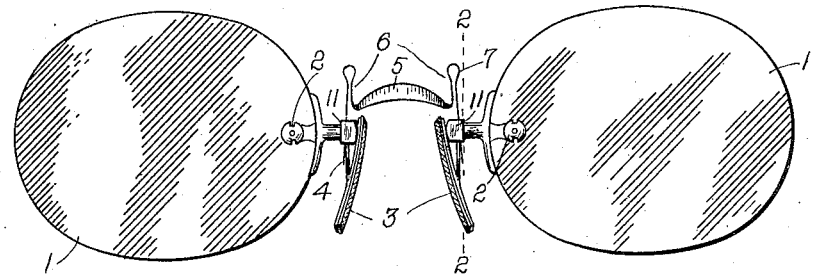
Figure 2:
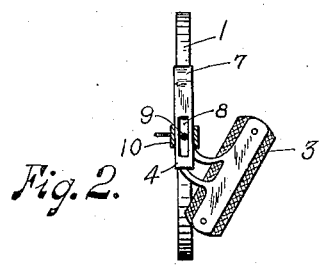
Figure 3:
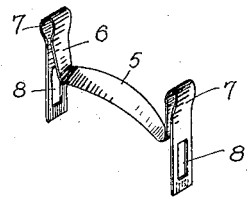

In the accompanying drawings, Figure 1 is a front elevation of a pair of eyeglasses equipped with my improved spring. Fig. 2 is a cross-section on the line 2 2 of Fig. 1. Fig. 3 is an enlarged perspective view of the spring detached.

Referring to the drawings, 1 represents the lenses of a pair of eyeglasses, secured to the posts 2 in the usual manner and having the nose-guards 3 also secured in the usual manner. The spring 4 is formed with a central bridge portion 5, bent upward substantially at right angles to the general direction of the bridge at each end, as shown at 6, each portion so bent upward being then bent back upon itself past the previous bend, as shown at 7, and having in the terminal portion below the bridge an elongated slot 8.

In securing the bridge and guards to the posts the screws 9 are passed through said slots, the sides of the terminal portions 7 of the spring being received within the walls 10 of the seats 11 of the posts.

It will readily be seen that by means of the slot each side of the spring may be adjusted independently of the other side. The slots also enable the bridge to be adjusted relatively to the lenses, so as to conform to the differences in height of the crest of the nose, thereby avoiding the necessity of keeping in stock a large number of different sizes of springs.

The construction permits of varying the distance between the two lenses by bending the bridge either more flat or more convex to lengthen or shorten the same. It also relieves the pressure of the nose-guards against the side of the nose by causing part of the weight of the eyeglasses to be supported upon the top of the nose.

An important advantage resulting from the vertical position of the sides 7 of the spring is that the upper bends of the spring form pivots about which the terminal portions of the spring can be bent outward to throw the lenses farther apart or can be bent slightly in front or to the rear of the vertical plane through the bridge for centering—that is to say, to throw the lenses slightly upward or down, as may be desired, to suit the peculiarities of the wearer's features.

I claim—

1. A pair of eyeglasses having posts and a central spring or bridge, said bridge at its ends being bent upward and then backward upon itself, and being formed in the terminal portions with elongated slots for attachment to the posts.

2. A pair of eyeglasses having posts and a central spring or bridge bent at its ends vertically upward and then back upon itself and downward below its first bends and apertured for attachment to the posts, substantially as described.

In witness whereof I have hereunto set my hand in the presence of two subscribing witnesses.

MYER GOLD.

Witnesses:
    BESSIE GORFINKEL,
    ANNIE PETERSON.